United States Patent [19]

Powers et al.

[11] 4,305,758

[45] Dec. 15, 1981

[54] LOW DENSITY CEMENT SLURRY AND ITS USE

[75] Inventors: Charles A. Powers, Tulsa; Robert C. Smith, Inola; George B. Holman, Tulsa, all of Okla.

[73] Assignee: Standard Oil Company (Indiana), Chicago, Ill.

[21] Appl. No.: 183,888

[22] Filed: Sep. 4, 1980

Related U.S. Application Data

[60] Division of Ser. No. 47,533, Jun. 11, 1979, Pat. No. 4,252,193, and a continuation-in-part of Ser. No. 163,030, Jun. 25, 1980, abandoned, and a continuation-in-part of Ser. No. 932,052, Aug. 8, 1978, abandoned.

[51] Int. Cl.$^3$ ............................................. C04B 7/02
[52] U.S. Cl. .................................................. 106/97
[58] Field of Search ...................................... 106/97

[56] References Cited

U.S. PATENT DOCUMENTS

| | | | |
|---|---|---|---|
| 3,764,357 | 10/1973 | Bowles et al. | 106/97 |
| 3,804,058 | 4/1974 | Messenger | 106/97 |
| 3,902,911 | 9/1975 | Messenger | 106/97 |
| 4,002,482 | 1/1977 | Coenen | 106/97 |
| 4,086,098 | 4/1978 | LeRuyet et al. | 106/97 |

*Primary Examiner*—James Poer
*Attorney, Agent, or Firm*—Scott H. Brown; Fred E. Hook

[57] ABSTRACT

A 9 to 12 ppg (1.08 to 1.4 kg/liter) cement slurry for use in oil well type completions which comprises hydraulic cement about 10 to about 30 weight percent hollow glass microspheres based on the weight of the cement and sufficient water to form a pumpable slurry with an API free water content of no more than about 2 volume percent. This slurry is preferably mixed with an amount of water required to produce a slurry with the hydraulic cement having at least an API minimum water content and an API free water content of no more than about 2 volume percent and an additional amount of water equal to about 1.3 to about 1.8 weight percent water based on the weight of the hydraulic cement for each weight percent of the microspheres. The microspheres have true particle densities of about 0.2 to about 0.5 gm/cm$^3$, hydrostatic collapse strengths of at least 500 psi (3447 kPa) and average particle diameters of less than about 500 microns.

23 Claims, 9 Drawing Figures

LOW DENSITY CEMENT SLURRY AND ITS USE

CROSS REFERENCE TO RELATED APPLICATIONS

This application is a continuation-in-part of U.S. patent application Ser. No. 163,030 filed June 25, 1980, now abandoned, and a division of application Ser. No. 047,533 filed June 11, 1979, now U.S. Pat. No. 4,252,193, and a continuation-in-part of application Ser. No. 932,052 filed Aug. 8, 1978, now abandoned, and by this reference, all of the subject matter of such U.S. applications are incorporated herein.

SUMMARY OF THE INVENTION

In oil well type completions of casing strings, weak formations are encountered which necessitate the use of lightweight cement. The lightweight cement of this invention comprises hydraulic cement, hollow glass microspheres and sufficient water to form a pumpable slurry with an API free water content of no more than about 2 volume percent. These microspheres have true particle densities of about 0.2 to about 0.5 gm/cm$^3$ as determined by ANSI/ASTM D 2840-69, hydrostatic collapse strengths of at least about 500 psi (3447 kPa) as determined by ANSI/ASTM D 3102-72 and average particle diameters of less than about 500 microns and can be used at about 8 to about 50 weight percent based on the weight of the hydraulic cement to satisfactorily produce slurries having densities of less than about 12 ppg (1.44 kg/liter). The lightweight cements of this invention have lower densities and attain higher strengths than the previously used cementing compositions with water added to reduce the density of the compositions and materials such as bentonite, diatomaceous earth, or sodium metasilicate added to keep the compositions from separating.

DETAILED DESCRIPTION

Figure 1:
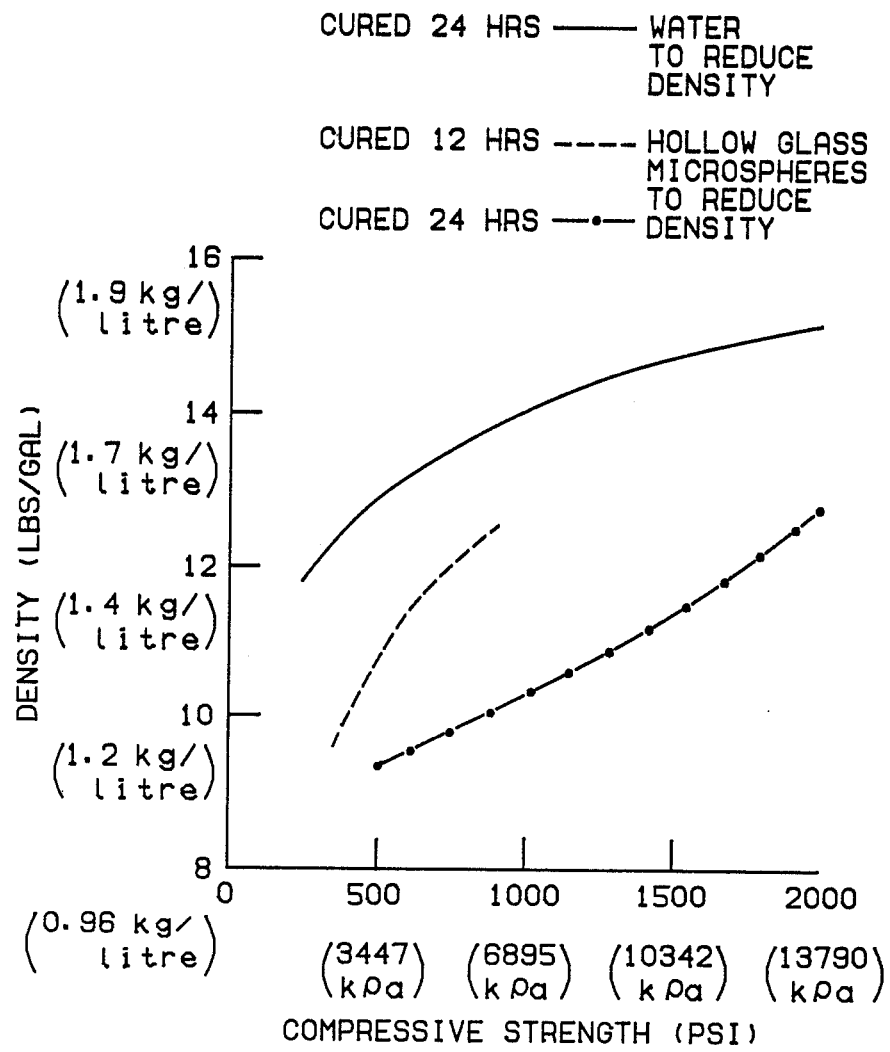
FIG. 1 is a comparison of the strength of the cement of this invention to the strength of previously used cements.

In oil well type cementing, it has now been found that a low density cement which comprises hydraulic cement, hollow glass microspheres and water is superior to previously described lightweight cements. Low density or lightweight cements are used in the completion of wells which extend through weak subterranean formations to reduce the hydrostatic pressure exerted by a column of the cement on the weak formations. Examples of such formations are the unconsolidated Late Tertiary formations encountered in the Gulf Coast Region of the United States, shallow coal seams encountered in Wyoming, Muskeg formations encountered in Canada, and fractured formations encountered worldwide. These formations are encountered when drilling wells for the recovery of subterranean resources such as oil, gas, minerals and water and the lightweight cement of this invention is useful in completing these wells. These completions are referred to herein as oil well type completions and include but are not limited to completions where the cement slurry is pumped downwardly through the casing in a well and upwardly into the annulus between the casing and the wall of the well, the cement slurry is placed in the annulus between the casing and the wall of a well by grouting techniques and a plug of the cement slurry is placed in the well for abandonment or for establishing a whipstock.

It is described in Part 3 of a series of articles on Basic Cementing, *Oil and Gas Journal*, Volume 75, No. 11, Mar. 14, 1977, that "Basically, lightweight slurries are made by adding more water to lighten the mixture and then adding materials which keep the solids from separating." Bentonite, diatomaceous earth and sodium metasilicate are described as materials which can be added to keep the solids from separating when the water is added for reducing the slurry density. It is also described that slurry densities as low as 10.8 ppg, (1.29 kg/liter) can be achieved by adding water. This method of producing lightweight cement slurries has the drawback that the addition of more water increases the cure time and reduces the strength of the resulting lightweight cement to the extent that they cannot be mixed to densities of less than about 10.8 ppg (1.29 kg/liter).

The low density cements of this invention are made by adding hollow glass microspheres and sufficient water to hydraulic cement to form a pumpable slurry. The additional water required because of the use of the microspheres is substantially less than that required when water is added to reduce the slurry density; therefore, the set cement of this invention has a substantially higher strength than previously used low density cements and cure time is reduced. Because of the additional strength, the lightweight cement of this invention can be formulated at densities much lower than the slurry density of 10.8 ppg (1.29 kg/liter) as described in the above referenced publication. This is illustrated in FIG. 1 where the compressive strengths of lightweight cements described in the above referenced publication are compared with the compressive strengths of the lightweight cements of this invention.

The comparisons shown in FIG. 1 were made with American Petroleum Institute (API) Class A cements at the API well simulation test schedule for a 1,000 foot (305 meter) well as described in "API Recommended Practice for Testing Oil Well Cements and Cement Additives," American Petroleum Institute, Washington, D.C., API RP-10B, 20th Edition, April 1977. These comparisons can be made with respect to the above referenced *Oil and Gas Journal* publication where it is described that most operators wait for cement to reach a minimum compressive strength of 500 psi (3447 kPa) before resuming operation. It is seen in FIG. 1 that a 9 ppg (1.08 kg/liter) cement mixture of this invention will attain a compressive strength of about 500 psi (3447 kPa) in 24 hours as compared to a 13 ppg (1.56 kg/liter)

cement mixture using water to reduce the density of the cement mixture and bentonite, diatomaceous earth or sodium metasilicate to keep the solids from separating. It is also seen that an 11 ppg cement mixture of this invention will attain a compressive strength of about 500 psi (3447 kPa) in 12 hours. This illustrates that the use of the lightweight cement of this invention can considerably reduce the waiting time while the cement is curing to the minimum strength, waiting on cement time (WOC).

The lightweight cement of this invention is also superior to the lightweight cement described in Biederman, U.S. Pat. No. 3,699,701, Maxson, U.S. Pat. No. 3,722,591, Gebhardt, U.S. Pat. No. 3,782,985, and Messenger U.S. Pat. No. 3,804,058. It is described in column 2 at lines 35 through 38 of Biederman that lightweight oil well cements may be formed by the addition of float ash, as aggregate, to existing oil well cements. Float ash is described in column 1 at lines 13 through 15 of Biederman as the portion of fly ash that floats on water and has a specific gravity around 0.7. The use of fly ash floaters is also described in column 2 at lines 7 through 18 of Gebhardt. It is described in column 2 at lines 17 through 22 of Maxson that a borehole can be lined with an insulating liner formed in situ by hardening in place a hardenable, flowable composition consisting essentially of a hardenable, flowable, adhesive cement and a divided, solid, closed-cell material. A suitable adhesive cement is described in column 3 at line 18 of Maxson as hydraulic cement. A suitable divided, solid, closed-cell material is described in column 3, at lines 59 through 63 of Maxson as fly ash floaters. It is described in column 5, at lines 4 through 8 of Messenger that pumpable cement slurries can be produced by mixing portland cement, anhydrous sodium metasilicate, water, and hollow sealed spheres made of ceramic or glass. Ceramic and glass spheres are compared in column 5 at lines 30 through 37 of Messenger where it is described that ceramic spheres are preferred in wells having hydrostatic pressures upward to about 2500 psi (17,237 kPa). The water required for producing the pumpable slurry of Messenger is described in column 5 at lines 38 through 55 and in column 6 at lines 1 and 2, where it is described that additional water is added for the glass spheres and for the sodium metasilicate. Advantages achieved by adding this extra water are described in column 2 at lines 11 through 16 of Messenger where it is described that the extra water increases the space between the suspended hollow sealed glass spheres and thus reduces the breakage of the spheres.

The additional water required by Messenger would have the same detrimental effects as described with respect to the lightweight slurries produced by adding water to reduce the density of the slurries and bentonite, diatomaceous earth, or sodium metasilicate to keep the solids from separating. Sample numbers 4a, 8, 9, 9a, 9b and 9c in Table II of Messenger are examples of Messenger's use of additional water along with sodium metasilicate to prevent water separation. Messengers addition of more water increases the cure time and reduces the strength of the resulting lightweight cement. Therefore, the lightweight cement of Messenger has longer cure times and is inferior in strength to the cement slurries of the present invention which are free from effective amounts of additives such as bentonite, diatomaceous earth and sodium metasilicate. An effective amount of one of these additives is an amount which would prevent the separation of water and particles from the slurry.

Figure 9:
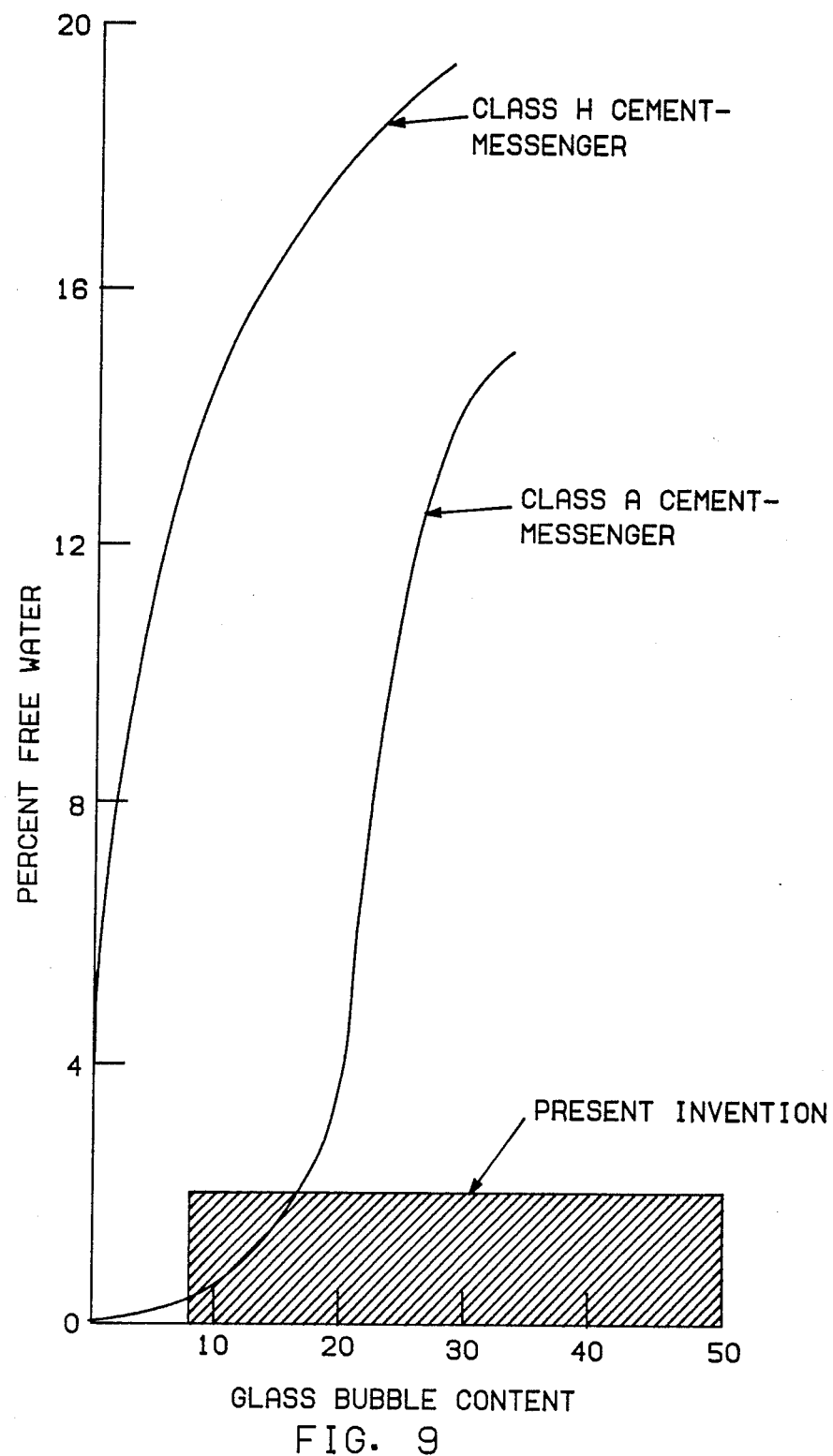
FIG. 9 shows API free water content as a function of glass bubble content of cement slurries of Messenger, U.S. Pat. No. 3,804,058.

The slurry of Messenger specified to contain 5 gallons of water per 94 lbs of cement and 4.4 gals of water per each 10 weight % glass spheres. The API free water content of slurries of portland cement, API Class A and H and IG 101 glass spheres marketed by Emerson & Cuming, Inc., prepared in accordance with Messenger is shown in FIG. 9 as the function of the percent glass spheres in the cement slurry.

The API free water content of this invention is maintained at no more than 2 volume percent and preferably less than about 1 volume percent to minimize water separation after placement of the slurry. Water separation in a column of cement can form pockets of free water within the cement column or reduce the height of the column of slurry. Pockets of free water within a cement column can cause corrosion of adjacent casing. Higher percentages of water separation can form channels through which fluid can migrate past the cement column. As shown in FIG. 9, all slurries of Messenger exceed 1% API free water content for the range of glass sphere content specified in Messenger and almost all slurries of Messenger exceed 2% API free water content for those same concentrations of spheres. All slurries in excess of 2% free water content suffer from severe particle separation.

The ceramic spheres described in Messenger are marketed by Emerson & Cuming, Inc. under the trade designation FA-A Eccospheres. These ceramic spheres are known in the industry as fly ash floaters or float ash.

It has been found that hollow ceramic spheres have properties which render them undesirable as additives in lightweight cements for oil well completions. A 12.7 ppg (1.52 kg/liter) slurry mixed with API Class A cement, about 20 weight percent hollow ceramic spheres and sufficient water to form a slurry with an API normal water content lost about 10% of its volume when subjected to pressures of less than about 5000 psi (34,474 kPa) and a 10 ppg (1.2 kg/liter) slurry mixed with API Class A cement, about 67 weight percent hollow ceramic spheres and sufficient water to form a slurry with an API normal water content lost about 10% of its slurry volume when subjected to pressures of less than about 2000 psi. The loss of volume by the 10 ppg (1.2 kg/liter) slurry results in a solid plug that is not pumpable. Slurries of this invention do not lose their pumpability after loss of 10% of their slurry volume under hydrostatic pressure, additionally the loss of slurry volume of the slurries of this invention is not proportional to the amount of hollow spheres mixed with the slurry.

It has also been found that lightweight cements mixed with these ceramic spheres suffer substantial increases in slurry density and reductions in slurry volume when cured under a hydrostatic pressure of about 500 psi (3447 kPa). A 9.7 ppg (1.16 kg/liter) slurry of API Class A cement, ceramic spheres, and sufficient water to form a slurry with an API normal water content did not shrink or increase in density when cured at atmospheric temperature and pressure. However, a sample of the same slurry cured at atmospheric temperature and under a hydrostatic pressure of 500 psi (3447 kPa) lost about 10% of its volume and increased in density to about 10 ppg (1.2 kg/liter).

The effect of hydrostatic pressure on the volume of a lightweight cement slurry mixed with hollow ceramic spheres detracts from the use of these slurries in oil well type completions. These detrimental effects are particularly serious when lightweight cement slurries are mixed with hollow ceramic spheres to produce slurries having densities of less than about 10 ppg (1.2 kg/liter). The lightweight cement of this invention does not suffer the substantial detrimental effects as shown in this application for lightweight cement slurries produced with hollow ceramic spheres. It will be described with respect to FIGS. 2 and 3 of this disclosure that the effect of hydrostatic pressure on the slurries of this invention is proportional to the density of the hollow glass spheres selected.

The hollow glass microspheres used to produce the lightweight cement of this invention have average particle diameters of less than about 500 microns and can be manufactured by the procedures described in Beck, et al, U.S. Pat. No. 3,365,315 and Veatch, et al, U.S. Pat. No. 3,030,215. In Beck, et al, it is described that hollow glass microspheres are made by passing particles of glass containing a gas forming material through a current of heated air or a flame. The gas forming materials can be incorporated within the glass particles by the simple step of allowing the particles, either at room temperature or at higher temperatures below melting, to absorb or adsorb the following materials from the atmosphere surrounding the particles: $H_2O$, $CO_2$, $SO_2$, $F_2$, etc. It is described in Veatch, et al, that hollow glass microspheres are made by subjecting a particulated mixture of siliceous material such as sodium silicate, a water-desensitizing agent such as boric acid and a blowing agent such as urea to an elevated temperature for a time necessary to fuse the particles and cause expansion of the particles to hollow glass spheres. High strength glass such as borosilicate glass can be used to produce hollow microspheres having hydrostatic collapse strengths of greater than about 5,000 psi (34474 kPa) as determined by the American Society for Testing and Materials procedure described in ANSI/ASTM D 3102-72.

Figure 2:
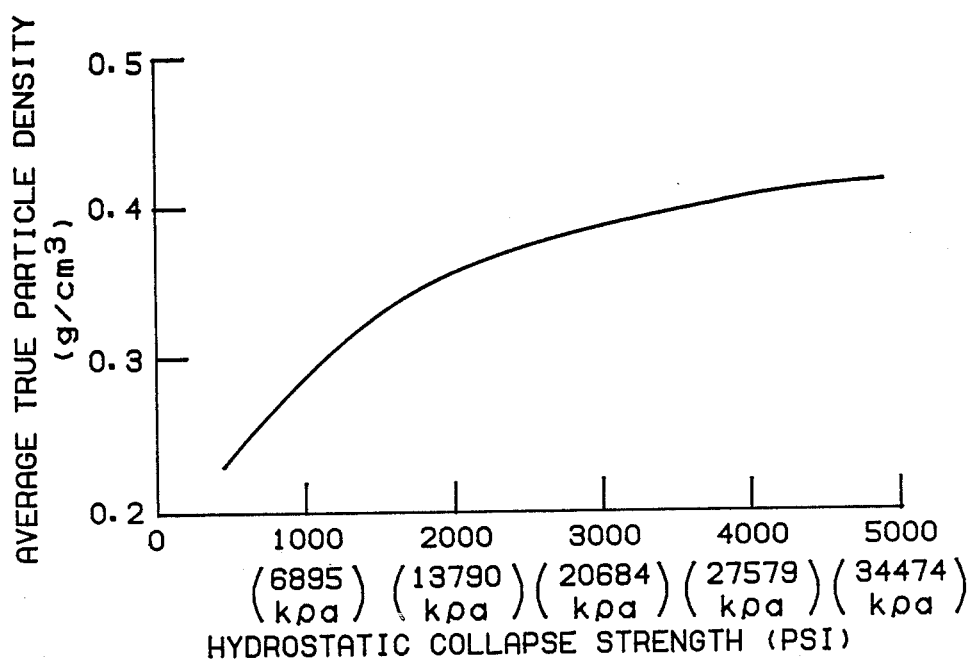
FIG. 2 shows the strength of hollow glass microspheres used in this invention.

It is illustrated in FIG. 2 that hollow microspheres with average true particle densities of about 0.2 $gm/cm^3$ as determined by the American Society for Testing and Materials procedure described in ANSI/ASTM D 2840-69 generally have ANSI/ASTM hydrostatic collapse strengths of less than about 500 psi (3447 kPa) while hollow glass microspheres with ANSI/ASTM average true particle densities of about 0.5 $gm/cm^3$ have ANSI/ASTM hydrostatic collapse strengths of greater than about 5,000 psi (34474 kPa).

The hydrostatic collapse strength measurements shown in FIG. 2 were made in accordance with the procedure described in ANSI/ASTM D 3102-72. The pressure required to collapse about 10 volume percent of the hollow glass microspheres is reported as the hydrostatic collapse strength of the microspheres. This is thought to simulate the hydrostatic pressure under which cement slurries containing these microspheres will be subjected during oil well type cementing operations and also simulates the isostatic pressure under which these microspheres will be subjected during these operations. These microspheres are generally manufactured to have average particle diameters of about 10 to about 300 microns.

Many of the uses for the lightweight cements of this invention will be in the completion of wells having depths of about 1,000 feet (305 meters) to about 6,000 feet (1,830 meters). It is described in API RP-10B that wells, for API simulated test conditions, having depths of about 1,000 feet (305 meters) will have bottom hole pressures of about 1020 psi (7,000 kPa) and that wells having depths of about 6,000 feet (1,830 meters) will have bottom hole pressures of about 3870 psi (26,700 kPa). Commercially available hollow glass microspheres with ANSI/ASTM true particle densities of about 0.3 $gm/cm^3$ and ANSI/ASTM hydrostatic collapse strengths of about 1,000 psi (6895 kPa) are satisfactory for completing API simulated wells to depths of about 1,000 feet (305 meters). Commercially available hollow glass microspheres with ANSI/ASTM true particle densities of about 0.4 $gm/cm^3$ and ANSI/ASTM hydrostatic collapse strengths of about 4,000 psi (27579 kPa) are satisfactory for completing API simulated wells to depths of about 6,000 feet (1,830 meters). In general, higher density and thus higher strength hollow glass microspheres are desirable for completing deeper wells. Glass spheres having ANSI/ASTM hydrostatic collapse strengths of greater than about 4000 psi (27,579 kPa) may be more economical for completing wells to depths of 10,000 feet (3,050 meters) and deeper.

Figure 3:
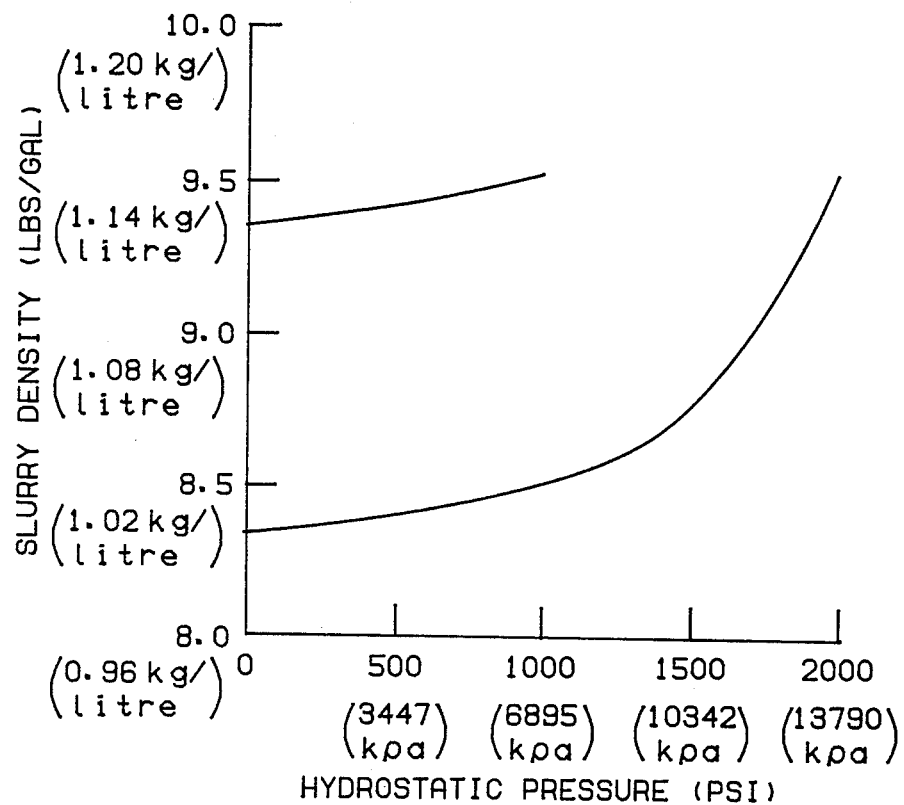
FIG. 3 shows the increase in slurry density of a slurry of this invention as hydrostatic pressure is increased.

It has been observed that cement slurries of this invention increase in density as pressure on the slurry is increased. This is illustrated in FIG. 3 where it is shown that slurry density can be compensated for by mixing the slurry with an amount of hollow glass microspheres which will provide the appropriate slurry density under the hydrostatic conditions which the slurry will be subjected. It is shown that a slurry to be subjected to a hydrostatic pressure of about 2,000 psi (13790 kPa) should initially contain a higher concentration of these microspheres than a slurry to be subjected to a hydrostatic pressure of about 1,000 psi (6895 kPa) and that after being subjected to these maximum hydrostatic pressures, both slurries would contain about the same concentration of these microspheres as evidenced by their slurry densities. It is noted from FIG. 3 that a higher percentage of the microspheres is lost as the hydrostatic pressure is increased from 1,500 to 2,000 psi (10342 to 13790 kPa) than is lost as the hydrostatic pressure is increased from 500 to 1,000 psi (3447 to 6895 kPa). The microspheres used for the tests shown in FIG. 3 would be satisfactory for completing a well with a bottom hole hydrostatic pressure of about 1,000 psi (6895 kPa); however, microspheres with higher collapse strengths may be more economical for use at greater depths.

The low density cement of the present invention is mixed with sufficient water to form a pumpable slurry with a free water content of no more than about 2 volume percent and preferably less than about 1 volume percent as determined by the procedure described in Section 4 "Determination of Water Content of Slurry," API RP-10B. The pumpable slurry of this invention preferably has greater than the minimum water content and most preferably has about the normal water content, both as described in this section of API RP-10B. A slurry having a minimum water content is described in API RP-10B as having a consistency of about 30 Bearden units of slurry consistency ($B_c$) while a slurry having a normal water content is described as having a consistency of about 11 $B_c$. A slurry with less than an API minimum water content is difficult to pump and a slurry with an API normal water content is considered as having an optimum consistency for pumping and a satisfactory free water content.

Figure 4:
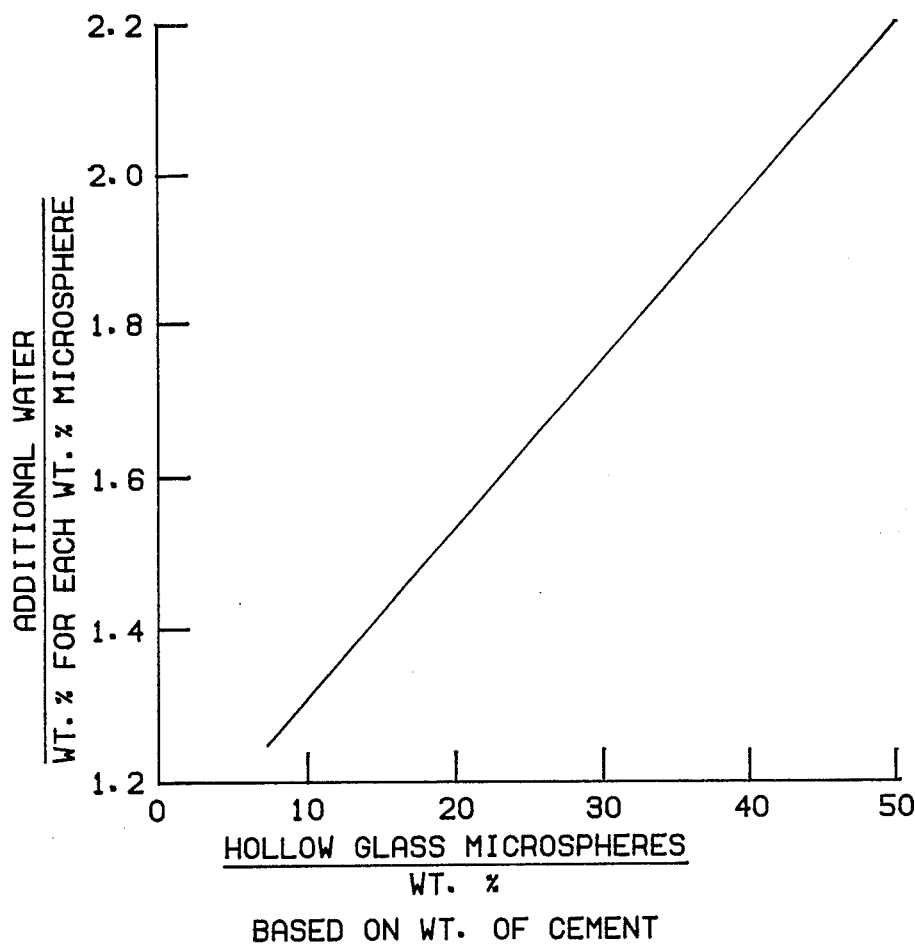
FIG. 4 shows the water required to form the slurries of this invention.

It is illustrated in FIG. 4 that a slurry of this invention formulated with API Class A portland cement and about 8 to about 50 weight percent hollow borosilicate glass microspheres based on the weight of the cement can be mixed with sufficient water to provide a slurry with an API normal water content. The hollow glass microspheres illustrated in these tests are B37/2000 microspheres marketed by the Minnesota Mining and Manufacturing Company and have average particle diameters of about 20 to about 130 microns. Other microspheres may have other water requirements. This slurry is mixed with sufficient water to form a pumpable slurry with the portland cement and an additional amount of water because of the microspheres equal to about 1.2 weight percent extra water for each weight percent of the hollow microspheres when the slurry is mixed with about 8 weight percent of the microspheres based on the weight of the cement and about 2.2 weight percent extra water for each weight percent of these microspheres when the slurry is mixed with about 50 weight percent of these microspheres by weight of the cement. At about 10 weight percent of these microspheres, the API free water content of a slurry mixed with about 1.3 weight percent extra water for each weight percent hollow microsphere is about 2.5 milliliters or about 1 volume percent. At about 30 weight percent of these microspheres the API free water content of a slurry mixed with about 1.8 weight percent extra water for each weight percent hollow microsphere is about 1 milliliter or about 0.4 volume percent.

The weight percent water for each weight percent of microspheres as shown in FIG. 4 is in addition to the water required to give a pumpable slurry with the cement. This is illustrated by an API Class A portland cement mixed with about 10 weight percent hollow glass microspheres having ANSI/ASTM average true particle densities of about 0.37 gm/cm$^3$ and about 59 weight percent water based on the weight of the cement to give a slurry having a density of about 12 ppg (1.4 kg/liter) and an API normal water content. About 46 weight percent water based on the weight of the cement is required to give a pumpable slurry with the cement and about 13 weight percent water based on the weight of the cement is required to wet the surface of the glass spheres and to give a pumpable slurry with the mixture of cement and glass spheres. Without the additional water for each weight percent of microspheres, the slurry of cement, glass spheres and water may not be pumpable.

The water content of the hydraulic cement slurries for use in producing the mixture of this invention is given in Section 4 of API RP-10B where normal and minimum water contents are specified. The hydraulic cement can contain any conventional additives needed to meet well conditions and should contain normal to minimum water contents as required when such additives are mixed with the hydraulic cement. Additives which may be desired are accelerators, loss circulation materials and dispersants. The following Table 1 also appears at Section 4 of API RP-10B and provides the water required for mixing neat API Classes of cement with water to produce slurries with normal water contents.

TABLE I

| | CEMENT SLURRY COMPOSITION | | |
|---|---|---|---|
| 1 | 2 Water Percent | 3 Water | |
| API Class Cement | by Weight of Cement | Gallons per 94 lb Sack | Liters per 42.6 kg Sack |
| A & B | 46 | 5.19 | 19.6 |
| C | 56 | 6.32 | 23.9 |
| D, E, F, & H | 38 | 4.29 | 16.2 |
| G | 44 | 4.97 | 18.8 |
| J | * | * | * |

*As recommended by the manufacturer.

Figure 5:
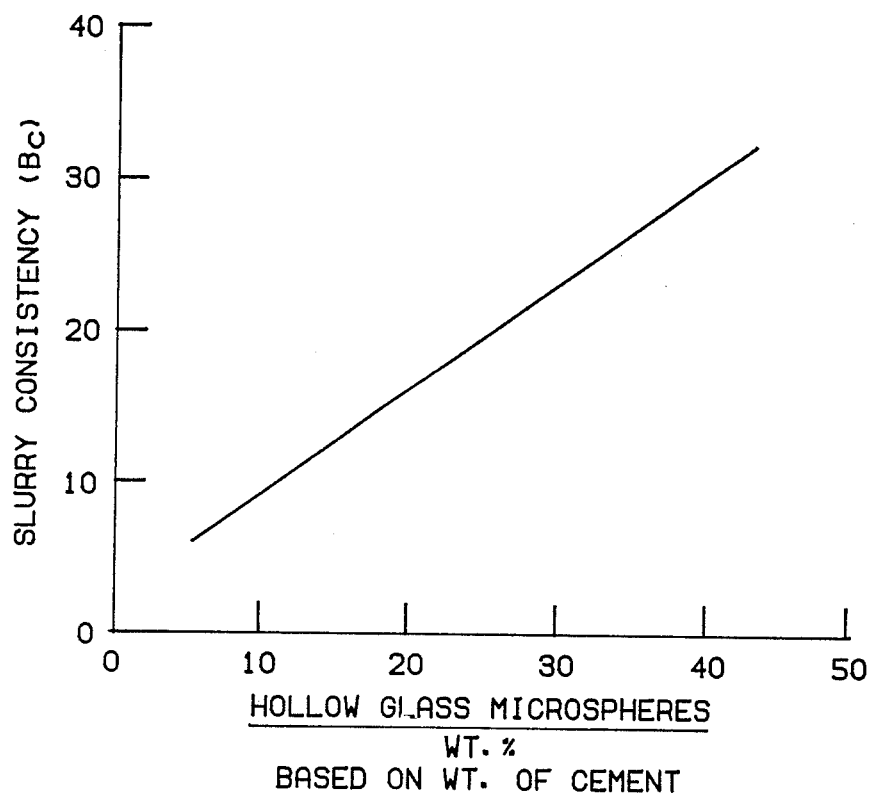
FIG. 5 shows the slurry consistency of the low density cement of this invention.

It is illustrated in FIG. 5 that about 1.3 weight percent extra water for each weight percent B37/2000 microsphere based on the weight of the cement will provide a slurry having an API normal water content at about 10 volume percent hollow microspheres based upon the weight of cement to a slurry having an API minimum water content at about 40 weight percent hollow glass microspheres.

Figure 6:
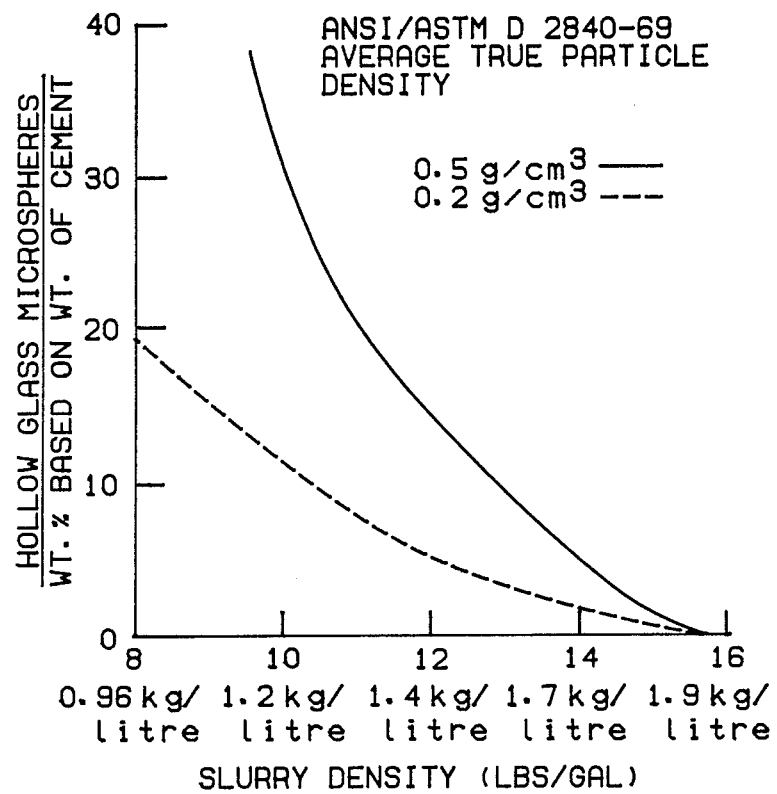
FIG. 6 shows the slurry densities attained by adding hollow glass spheres.

It is shown in FIG. 6 that an API Class A cement mixed with glass microspheres having ANSI/ASTM average true particle densities within the the range of about 0.2 to about 0.5 gm/cm$^3$ and an API normal water content can be formulated to produce slurries having densities of less than about 12 ppg (1.4 kg/liter). Generally microspheres with ANSI/ASTM true particle densities within the range of about 0.3 to about 0.4 gm/cm$^3$ will be used to produce slurries having densities of about 9 to about 12 ppg (about 1.08 to about 1.4 kg/liter).

The lightweight cement of this invention can be formulated with any hydraulic cement normally used in oil well type cementing and the hollow glass microspheres can be used in combination with other additives. Portland cements are the basic hydraulic cements now being used for oil well type cementing and are often mixed with accelerators, retarders, dispersants and loss circulation agents to meet specific well conditions.

Figure 7:
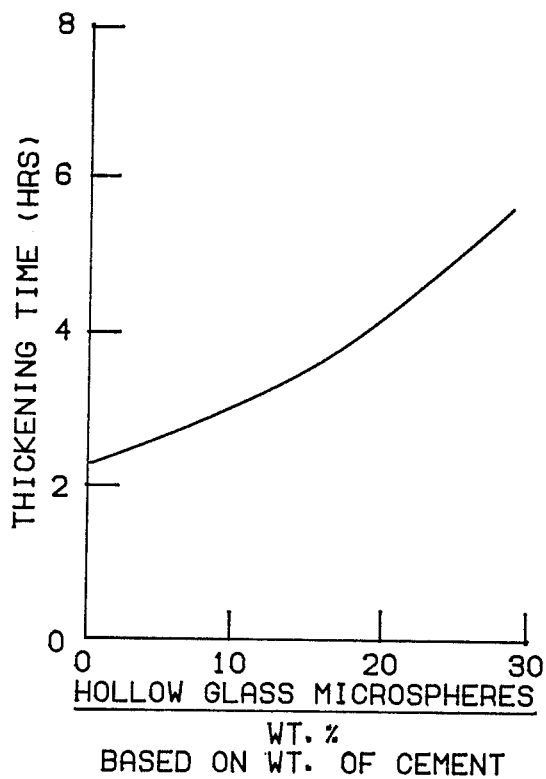
FIG. 7 shows API thickening times of slurries of this invention.
Figure 8:
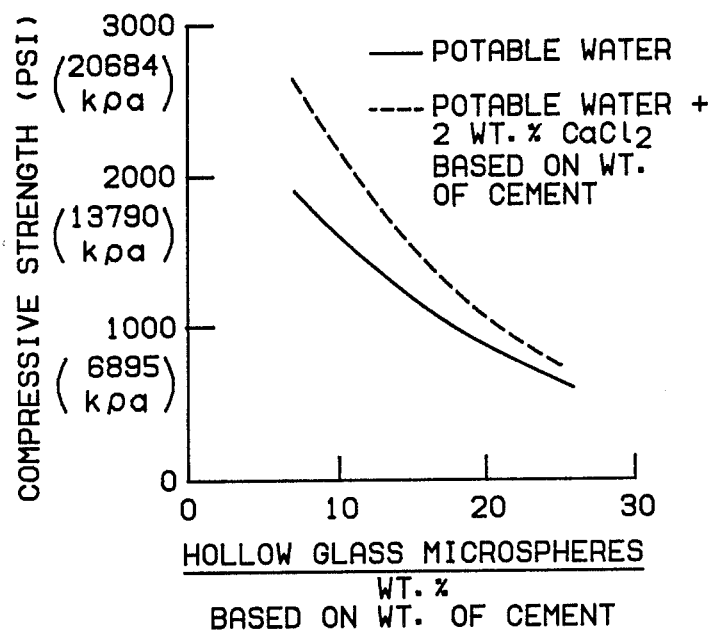
FIG. 8 shows API compressive strengths of slurries of this invention.

The use of calcium chloride as an accelerator in the low density cement of this invention is illustrated in FIGS. 7 and 8 where it is seen that the thickening times of the lightweight cements of this invention generally increase as they are mixed with higher concentrations of hollow glass microspheres and that their compressive strengths generally decrease at higher concentrations of microspheres. It is also seen that calcium chloride has a greater accelerating effect on the lightweight cements of this invention mixed with lower concentrations of hollow glass microspheres. The calcium chloride is diluted by the additional water for each weight percent glass microsphere.

Tests have also been conducted on API Class A cement mixed with about 25.5 weight percent hollow glass microspheres having ANSI/ASTM true particle densities of about 0.37 gm/cm$^3$ and with dispersant and gypsum hemihydrate. The percent microspheres is based on the weight of the cement. Dispersants are known for reducing the water required in the mixing of cements and gypsum hemihydrate is known for producing a cement slurry that will attain a high gel strength when movement of the slurry is reduced or terminated. Cement slurries which gel when movement is reduced are useful for plugging fractures or filling voids which extend from a wellbore and for reducing the hydrostatic pressure applied by the slurry to weak subterranean formations after placement of the cement slurry has been completed. The addition of 0.75 weight percent dispersant based on the of weight of the cement reduced the extra water required because of the addition of the hollow glass microspheres from 1.65 to about 1 weight percent water for each percent of these microspheres based on the weight of the cement. The addition of 7.5 weight percent gypsum hemihydrate provided a slurry with a gel strength of about 1,000 pounds per 100 square feet (50 kg/cm$^2$) after movement of the slurry had been suspended for about 12 minutes as compared to a gel strength of about 50 pounds per 100 square feet (2.5 kg/cm$^2$) for a slurry containing no gypsum hemihydrate.

The low density cement of this invention is also useful in abnormally hot wells because it is characterized on curing by having quite high compressive strength at elevated temperatures (above 110° C.). In the unusual case in which the API cement (except Class J) is to be cured under or later subjected to high temperature conditions (above around 110° C.), the initial compressive strength is not maintained but may decrease rapidly, of the order of 30% or more. The lightweight cement of this invention is also useful in steam or hot water injection wells and producing wells from thermal sources and the like, as well as in wells penetrating permafrost, where there is a definite need to obtain a satisfactory insulating lining between the fluid and the formations surrounding the well.

It has been observed that the lightweight cement of this invention has a high temperature strength at temperatures above 230° F. (110° C.) which is at least the same order of magnitude as (and sometime exceeds) that of the material when cured at a temperature in the order of 90° to 120° F. (32° to 49° C.). This is illustrated with respect to the following example of a slurry of the present invention. An API Class A cement slurry in the absence of finely divided hollow spheres would contain approximately 46 weight percent of water. If 25.5 weight percent of B37/2000 spheres are added (ANSI/ASTM average average true particle density of 0.37 gm/cm$^3$), an additional 34 weight percent of water, about 1.3 weight percent water for each weight percent hollow spheres, for a total of 80 weight percent water can be incorporated in this particular case. The percentages are based on the weight of the cement. The density of the resulting slurry is of the order of 9.5 ppg (1.14 kg/liter). When this slurry is cured at about 300° F. (149° C.) it has a one day strength of about 1,000 psi (6895 kPa). A sample of this lightweight cement exposed to a temperature of 300° F. (149° C.) for seven (7) days has a compressive strength of about 970 psi (6688 kPa) which is an inconsequential reduction. For all practical purposes, one can say the two compressive strengths are identical. Ordinarily, an API Class A oil well cement slurry with no low density additive upon curing would have a 1 day strength of the order of 3,000 psi (20684 kPa) at 300° F. (149° C.) temperature, but exposed to this temperature of 300° F. (149° C.) for seven (7) days would regress typically approximately 30%. A lightweight cement produced by adding water to reduce the density of the slurry to about 13 ppg (1.56 kg/liter) and bentonite, diatomaceous earth or sodium metasilicate to keep the solids from separating would lose substantially all of its compressive strength after being cured at 300° F. (149° C.) for one week.

Examples of the hollow glass microspheres which have been found to be useful in formulating the lightweight cement of this invention are shown in Table II.

TABLE II

| | Free-Flowing Hollow Glass Sphere Properties-Typical | | | | |
|---|---|---|---|---|---|
| Type | 1G101 | 1GD101 | B23/500 | B37/2000 | B38/4000 |
| Made by* | E-C | E-C | 3M | 3M | 3M |
| Glass** | SB | SB | SLB | SLB | SLB |
| ANSI/ASTM average true particle density, (gm/cm$^3$) | 0.31 | 0.3 | 0.23 | 0.37 | 0.38 |
| Average particle diameter, (microns) | 40–175+ | 40–150 | 20–130 | 20–130 | 20–130 |
| ANSI/ASTM hydrostatic collapse strength at 10 vol. percent collapse, | | | | | |
| (psi) | unknown | unknown | 500 | 2000 | 4000 |
| (kPa) | unknown | unknown | 3447 | 13790 | 27579 |
| Hydrostatic collapse strength - volume percent survivors at 1500 psi | | | | | |
| (10340 kPa) | 47 | 76.6 | unknown | unknown | unknown |
| Softening temperature (°C) | 480 | 480 | 715 | 715 | 715 |

*E-C means Emerson & Cuming, Inc., Canton, Massachusetts
3M means 3M Manufacturing Co., St. Paul, Minnesota
**-SB sodium borosilicate glass
SLB is soda lime borosilicate glass (Note: in the claims both sodium borosilicate glass and soda lime borosilicate glass are referred to generically as "sodium borosilicate glass" or "borosilicate glass." Thermal conductivity is of the order of 8 to 11 (K cal)(cm)(hr)(sq m)(°C.).)

The Emerson and Cuming microspheres are thought to be manufactured by the procedure described in Veatch, et al, U.S. Pat. No. 3,030,215 and the 3M Manufacturing Company microspheres are thought to be manufactured by the procedure described in Beck, et al, U.S. Pat. No. 3,365,315. The commercially available hollow glass microspheres manufactured by the procedure described in Beck, et al, have strengths that vary with ANSI/ASTM true particle densities as shown in FIG. 2 and are useful under the broad range of hydrostatic pressure conditions expected to be encountered in the use of a lightweight cement of this invention. Microspheres manufactured by procedures other than the procedures described in Beck, et al, U.S. Pat. No. 3,365,315 may not be satisfactory for use under conditions where the lightweight cement of this invention is subjected to hydrostatic pressures of greater than about 1500 psi (10340 kPa).

Since the spheres are made of glass, it is apparent that one must be careful in mixing the spheres and cement together. It is not necessary to use metasilicate; however, these materials may be mixed by being moved into a storage tank using a large vacuum cleaner or diaphragm pump. It is desirable during such mixing that personnel be equipped with respirators and goggles.

The use of a densitometer or a pressurized fluid density balance as described in Appendix B to API RP-10B are about the minimum equipment currently necessary to monitor the density. A manual centrifuge can also be used in making the determination of water content. With a manual centrifuge there is no need to depend upon a source of electric power or the like. Shortly before the mixing is going to commence at the field location, we prepare small test samples containing the amount of solid ingredients planned for a particular job, each having a calibrated amount of water amounting, for example, to 70%, 80%, 90%, and 100% (based on cement weight). These separate samples are centrifuged which causes the material to separate out into a cement portion, a water portion, and a portion containing finely divided glass spheres. One prepares a graph in which the true or calibrating percentage of water is plotted along one axis and that determined from the centrifuge volume is plotted along the other axis. A smooth curve is drawn through the points. This calibrates the centrifuge.

Then when the actual mixing of the cement, glass spheres and water takes place, samples are taken every two minutes and centrifuge these in the calibrated centrifuge. The volume with water found in the sample is determined as against the calibration curve to determine the actual percent concentration of water in that particular sample. The rapidity of the operation can be judged by the fact that a typical figure for slurry mixing rate is about 4 barrels per minute (636 liter/min).

To give a specific example of such an operation, 2,000 lbs (907 kg) of IGD-101 hollow glass microspheres were blended with 85 sacks, 8,000 lbs (3630 kg), of Oklahoma API Class A cement. The cement and the tiny glass hollow spheres were blended in two batches of equal volume. In each batch, half the cement was vacuum injected into the blender, then the spheres, and then the remainder of this cement. The batches were blown back and forth from tank to bulk truck three times to mix the hollow spheres with the cement. The blending operation took 1½ hours, including unpacking the glass spheres. Four cement company personnel were employed in this operation. Dust was not excessive but goggles and dust masks were worn by all personnel in the blending area. In this operation, the glass spheres were dumped into a cone very much like the Halliburton hopper for jet mixing, then were sucked vertically out of the cone with a 6 in. (15 cm) diameter vacuum pipe. It was found that a quite homogeneous mixture of finely ground cement (nominally through 300 mesh) and the IGD-101 Microballoons was obtained by this procedure.

This material was then mixed to form the lightweight cement slurry. During this, a special Halliburton loop densitometer with a range from 8.3 lbs/gal to 10.8 lbs/gal (0.99 to 1.29 kg/liter) was employed, which had been calibrated with water at 8.34 ppg (1 kg/liter). The mixing was done with a jet mixer and a pump truck equipped with two Halliburton T-10 pumps, i.e., typical oilfield equipment. The slurry was mixed at different feed water pressures ranging from 125 to 475 psi (8.79 to 33.4 kg/cm$^2$). The slurry was best mixed at a feed water pressure of 475 psi (33.4 kg/cm$^2$). Then, as mentioned above, mixed at a rate of 4 barrels per minute (636 liter/min.), the slurry was quite adequately pumpable, although it appeared somewhat thick. The centrifuge showed the water content to be in the range of 80% to 85%, which was the objective; a pycnometer showed slurry specific gravity of the range of 1.03 to 1.14. The loop densitometer chart showed ranges of specific gravity from 1.04 to 1.06 which upon calibration against the pycnometer measurements showed the densitometer to be substantially accurate.

The field processing of the lightweight pumpable hydraulic cement slurry as has been described is straightforward and essentially is as follows: the homogeneously blended dry materials, namely spheres and cement, are mixed at the well with the amount of water equivalent to (a) the customary amount of water (API normal to minimum water contents) plus (b) the excess based on the concentration of spheres, as described above. This produces a slurry with consistency in the range from a maximum consistency of 30 B$_c$ (API) to one with a free water not exceeding 2 volume percent (API) (tests for consistency in Beardens and for percent free water are as specified in API code RP 10B). When so prepared, the material is pumped by ordinary cementing trucks using the usual cementing procedures. In one such procedure, the cement is pumped downwardly through the casing then flows up and around it, permitting casing manipulation such as scratching, rotating, oscillating, etc., to displace the drilling mud and do a good cement job.

After the cement placement, we find that ordinary waiting on cement (WOC) times result. The development of strength as the slurry sets depends not only on temperature and pressure but on cement class, water content and presence of additives. Oil well cementing slurries of this invention develop relatively high compressive strengths within 12 hours as illustrated in FIG. 1, whereas previously used low density slurries developed only low strengths after 24 hours. This is particularly true for slurry densities in the range of about 1.08 to about 1.4 kg/liter (about 9 to about 12 pounds per gallon).

It is extremely time consuming to determine the reaction of cements to the presence of all types of cement additives. However, tests to date do not indicate any difference in the use of the cement additives with these particular slurries, compared to those prepared in the absence of the finely divided hollow spheres. In other words, such things as dispersants, accelerators, and the like operate essentially in the same fashion as before.

It should be emphasized that the cured or set cement (the solid resulting from the slurry already described) has an additional valuable property in addition to high mechanical strengths and low densities. This is that it has considerably less thermal conductivity than ordinary cements cured from slurries which do not contain these hollow spheres. As is the case for other heat insulators, the presence of the inclosed gas in the very large number of hollow spheres incorporated into the set solid gives a marked decrease in thermal conductivity.

This is important when setting cement against permafrost or where well fluids are quite hot.

Two casing strings have been experimentally completed with the lightweight cement of the present invention. In both completions, circulation of cement to the mudline was observed with a remote camera. These casing strings were the 24 inch (610 mm) and 16 inch (406 mm) casing strings which, respectively, extended 600 and 1,000 feet (183 and 305 m) below the mud line in 1,000 feet (305 m) of water. Previous attempts on similar wells to circulate commercially available low density cements to the mud line had failed.

The 24 inch (610 mm) casing string was cemented with about 2,456 cubic feet (70 m³) of slurry formulated by mixing about 900 sacks (84,600 pounds, 38370 kg) of API Class A Portland cement with about 1,300 pounds (590 kg) of calcium chloride, about 144 (65 kg) pounds of defoamer, about 22,500 pounds (10,206 kg) of B37/2000 hollow glass microspheres and sufficient fresh water to produce a 9.5 ppg (1.14 kg/liter) slurry. The 16 inch (406 mm) casing string was cemented with about 2,188 cubic feet (62 m³) of slurry formulated by mixing about 800 sacks (75,200 pounds 34110 kg) of API Class A portland cement with about 1,200 pounds (544 kg) of calcium chloride, about 128 (58 kg) pounds of defoamer, about 20,000 pounds (9072 kg) of B37/2000 hollow glass microspheres and sufficient fresh water to produce a 9.5 ppg (1.14 kg/liter) slurry. The microspheres, defoamer, and calcium chloride were dry blended with the cement and then the dry blended mixture was mixed with the water just prior to cementing the casing strings.

It will be readily apparent to those skilled in the art of cementing oil wells and the like that the utility of the slurry and of the resulting composition are not dependent upon the embodiments shown and that a considerable variation can be permitted, as set out in the scope of the appended claims.

What is claimed is:

1. A hydraulic cement slurry which comprises as its essential components:
   hydraulic cement, about 8 to about 50 weight percent hollow glass microspheres by weight of the cement and sufficient water to form a pumpable slurry, wherein the API free water content of said slurry is no more than about 2 volume percent based only on said hydraulic cement and said microspheres, and said microspheres have ANSI/ASTM D 2840-69 average true particle densities of about 0.2 to about 0.5 gm/cm³, ANSI/ASTM D 3102-72 hydrostatic collapse strengths of at least 500 psi (3447 kPa) and average particle diameters of less than about 500 microns.

2. A hydraulic cement slurry which comprises:
   hydraulic cement, from about 8 to about 50 weight percent hollow glass microspheres by weight of the cement and sufficient water to form a pumpable slurry with an API free water content of no more than about 2 volume percent, wherein said slurry is free from effective amounts of sodium metasilicate and said microspheres have ANSI/ASTM D 2840-69 average true particle densities of about 0.2 to about 0.5 gm/cm³, ANSI/ASTM D 3102-72 hydrostatic collapse strengths of at least 500 psi (3447 kPa) and average particle diameters of less than about 500 microns.

3. A cement slurry which comprises:
   hydraulic cement, about 8 to about 50 weight percent hollow glass microspheres based on the weight of the cement and, as substantially all of the water in the slurry, an amount of water required to produce a pumpable slurry with the hydraulic cement and microspheres having an API free water content of no more than about 2 volume percent, wherein said microspheres have ANSI/ASTM D 2840-69 true particle densities of about 0.2 to about 0.5 gm/cm³, ANSI/ASTM D 3102-72 hydrostatic collapse strengths of at least 500 psi (3447 kPa) and average particle diameters of less than about 500 microns.

4. A cement slurry which comprises:
   hydraulic cement, about 8 to about 50 weight percent hollow glass microspheres based on the weight of the cement and, as substantially all of the water in the slurry, an amount of water required to produce a pumpable slurry with the hydraulic cement having an API free water content of no more than about 2 volume percent and an additional amount of water equal to about the amount shown in FIG. 4 for each weight percent of said microspheres, wherein said microspheres have ANSI/ASTM D 2840-69 true particle densities of about 0.2 to about 0.5 gm/cm³, ANSI/ASTM D 3102-72 hydrostatic collapse strengths of at least 500 psi (3447 kPa) and average particle diameters of less than about 500 microns.

5. A cement slurry which comprises:
   hydraulic cement, about 8 to about 50 weight percent hollow glass microspheres based on the weight of the cement and an amount of water required to produce a pumpable slurry with an API free water content of less than about 2 volume percent, wherein said microspheres have ANSI/ASTM D 2840-69 average true particle densities of about 0.2 to about 0.5 gm/cm³, average particle diameters of less than about 500 microns and ANSI/ASTM D 3102-72 hydrostatic collapse strength after collapse of about 10 volume percent of said microspheres substantially as shown in FIG. 2.

6. A cement slurry which comprises:
   hydraulic cement, about 8 to about 50 weight percent hollow glass microspheres based on the weight of the cement and an amount of water required to produce the pumpable slurry with an API free water content of less than about 2 volume percent, wherein said microspheres are manufactured by the procedure described in Beck, et al, U.S. Pat. No. 3,365,315, have ANSI/ASTM D 2840-69 average true particle densities of about 0.2 to about 0.5 gm/cm³, ANSI/ASTM D 3102-72 hydrostatic collapse strengths of at least 500 psi (3447 kPa) and average particle diameters of less than about 500 microns.

7. The cement slurry of claim 1, 2, 3, 4, 5 or 6 which comprises sufficient water to form a pumpable slurry with at least an API minimum water content and an API free water content of no more than 2 volume percent.

8. The cement slurry of claim 1, 2, 3, 4, 5 or 6 which comprises sufficient water to form a pumpable slurry with at least an API minimum water content and an API free water content of less than about 1 volume percent.

9. The cement slurry of claim 1, 2, 3, 4, 5, or 6 which comprises sufficient water to form a pumpable slurry with an API normal water content.

10. The cement slurry of claim 1, 2, 3, 4, 5, or 6 wherein said microspheres have ANSI/ASTM average true particle densities of about 0.3 to about 0.4 gm/cm$^3$.

11. The cement slurry of claim 1, 2, 3, 4, 5, or 6 wherein the average particle diameters of said microspheres are about 10 to about 300 microns.

12. The cement slurry of claim 1, 2, 3, 4, 5, or 6 wherein said hydraulic cement is portland cement.

13. The cement slurry of claim 1, 2, 3, 4, 5, or 6 wherein said slurry comprises about 10 to about 30 weight percent hollow glass microspheres based on the weight of the cement.

14. The cement slurry of claim 1, 2, 3, 4, 5, or 6 wherein said slurry comprises, as substantially all of the water in the slurry, an amount of water required to produce a slurry with the hydraulic cement having at least an API minimum water content and an API free water content of no more than about 2 volume percent and an additional amount of water equal to about 1.2 to about 2.2 weight percent water based on the weight of the cement for each weight percent of said microsphere.

15. The cement slurry of claim 13 wherein said slurry comprises, as substantially all of the water in the slurry, an amount of water required to produce a slurry with the hydraulic cement having at least an API minimum water content and an API free water content of no more than about 2 volume percent and an additional amount of water equal to about 1.3 to about 1.8 weight percent water based on the weight of the cement for each weight percent of said microsphere.

16. The cement slurry of claim 1, 2, 3, 4, or 6 wherein said hollow glass microspheres are further characterized in that said microspheres having ANSI/ASTM average true particle densities of about 0.3 gm/cm$^3$ have ANSI/ASTM hydrostatic collapse strengths after collapse of about 10 volume percent of said microspheres of at least about 1000 psi (6895 kPa).

17. The cement slurry of claim 16 wherein said hollow glass microspheres are further characterized in that said microspheres having ANSI/ASTM average true particle densities of about 0.4 gm/cm$^3$ have ANSI/ASTM hydrostatic collapse strengths after collapse of about 10 volume percent of said microspheres of least about 4000 psi (27,579 kPa).

18. The cement slurry of claim 1, 2, 3, 4, or 6 wherein said microspheres are further characterized in that said microspheres have ANSI/ASTM hydrostatic collapse strengths after collapse of about 10 volume percent of said microspheres substantially as shown in FIG. 2.

19. The cement slurry of claim 1, 2, 3, 4, or 5 wherein said microspheres are manufactured by the procedure described in Beck, et al, U.S. Pat. No. 3,365,315.

20. A pumpable, lightweight hydraulic cement slurry useful for oilfield cementing and the like comprising a mixture of a finely-ground hydraulic cement; between about 8 and 50 weight percent (by weight of cement) of finely-divided hollow glass microspheres having a density not substantially exceeding an ANSI/ASTM average true particle density of 0.5 gm/cm$^3$, an ANSI/ASTM hydrostatic collapse strength of at least 500 psi (3447 kPa), and a softening temperature not less than about 480° C., said microspheres having an average particle diameter in the range of about 10 to about 300 microns; and water in an amount to produce a maximum slurry consistency not substantially exceeding 30 B$_c$ (API) and less than that producing 2 volume percent free water content (API).

21. A slurry in accordance with claim 20 in which the amount of water in said slurry is in excess of the API normal water content for said hydraulic cement by an amount ranging substantially between 1.2 weight percent to 2.2 weight percent (by weight of cement) per each weight percent of said hollow spheres (by weight of cement).

22. A slurry in accordance with claim 21 in which said hollow spheres are made of sodium borosilicate glass and said excess of water is of the order of 1.3% to 1.8 weight percent (by weight of cement) per each weight percent of said hollow spheres (by weight of cement).

23. A set hydraulic cement slurry of relatively high strength and low thermal conductivity at elevated temperatures (that is, at temperatures of the order of at least 230° F. or 110° C.)

comprising an essentially homogeneous mixture of commercially available portland cement and a density reducer comprising between 8 and 50 weight percent (by weight of cement) of finely-divided hollow glass microspheres having an ANSI/ASTM true particle density in the range of about 0.2 to about 0.5 gm/cm$^3$, an ANSI/ASTM hydrostatic collapse strength of at least about 500 psi (3447 kPa), average particle diameters in the range of about 10 to about 300 microns, and a thermal conductivity of the order of 8 to 11 (Kcal)(cm)(hr)(sq m)(°C.), to which was added during slurrying an amount of water, (in excess of the conventional amount of water based on the cement for producing a slurry with said cement having an API normal water content), amounting to between about 1.2 and about 2.2 weight percent times the weight percent of said spheres.

* * * * *